US009696692B2

(12) United States Patent
Chouinard

(10) Patent No.: US 9,696,692 B2
(45) Date of Patent: Jul. 4, 2017

(54) INDUSTRIAL AUTOMATION CONTROL SYSTEM

(71) Applicant: ROCKWELL AUTOMATION TECHNOLOGIES, INC., Mayfield Heights, OH (US)

(72) Inventor: Julien Chouinard, Quebec (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 754 days.

(21) Appl. No.: 13/830,533

(22) Filed: Mar. 14, 2013

(65) Prior Publication Data

US 2013/0274901 A1      Oct. 17, 2013

Related U.S. Application Data

(60) Provisional application No. 61/624,128, filed on Apr. 13, 2012.

(51) Int. Cl.
*G05B 11/01*      (2006.01)
*G05B 9/03*      (2006.01)
*G05B 23/02*      (2006.01)

(52) U.S. Cl.
CPC ............. *G05B 11/01* (2013.01); *G05B 9/03* (2013.01); *G05B 23/0286* (2013.01)

(58) Field of Classification Search
CPC ....... G05B 11/01; G05B 23/0286; G05B 9/03
See application file for complete search history.

(56) References Cited

U.S. PATENT DOCUMENTS

| | | | |
|---|---|---|---|
| 6,061,600 A * | 5/2000 | Ying | 700/3 |
| 6,567,709 B1 * | 5/2003 | Malm et al. | 700/21 |
| 2009/0072986 A1 * | 3/2009 | Bussert et al. | 340/679 |
| 2010/0287421 A1 * | 11/2010 | Golowner et al. | 714/55 |
| 2012/0036493 A1 * | 2/2012 | Moosmann et al. | 717/105 |
| 2012/0095573 A1 * | 4/2012 | Moosmann | 700/7 |
| 2013/0007505 A1 * | 1/2013 | Spear | G06F 11/2025 714/4.11 |

* cited by examiner

*Primary Examiner* — Christopher E Everett

(57) ABSTRACT

One or more non-transitory computer-readable storage media having program instructions stored thereon for enhancing an automation environment is provided. When executed by a processor, the program instructions direct the processor to at least identify at least a primary data verification value generated by a primary control process that provides control in an industrial automation environment, and to identify at least a secondary data verification value generated by a secondary control process associated with the primary control process. The program instructions also direct the processor to compare the primary data verification value with at least the secondary data verification value to determine if an error has occurred with respect to the primary control process.

18 Claims, 9 Drawing Sheets

INDUSTRIAL AUTOMATION CONTROL SYSTEM

RELATED APPLICATIONS

This application hereby claims the benefit of and priority to U.S. Provisional Patent Application No. 61/624,128, titled "INDUSTRIAL AUTOMATION CONTROL SYSTEM PROGRAMMING ENVIRONMENT", filed on Apr. 13, 2012 and which is hereby incorporated by reference in its entirety.

TECHNICAL BACKGROUND

In many industrial environments the quantity and complexity of the equipment used requires automation in order to make productive use of the equipment. Unfortunately, when problems occur with automated equipment, the error may not be immediately detected and corrected by human operators of the equipment, resulting in defective products, spills, breakage, or other dangerous situations.

Some equipment, either by its mode of operation or the material it processes, may be dangerous or fatal to nearby personnel if an error occurs in the control of the equipment. Therefore, in an industrial automation environment, it is vital to detect and correct error conditions on automated equipment as quickly and safely as possible.

OVERVIEW

In an embodiment, one or more non-transitory computer-readable storage media having program instructions stored thereon for enhancing an automation environment is provided. When executed by a processor, the program instructions direct the processor to at least identify at least a primary data verification value generated by a primary control process that provides control in an industrial automation environment, and to identify at least a secondary data verification value generated by a secondary control process associated with the primary control process. The program instructions also direct the processor to compare the primary data verification value with at least the secondary data verification value to determine if an error has occurred with respect to the primary control process.

In another embodiment, a control system for an industrial automation environment is provided. The control system includes a memory configured to store software instructions, and a processor coupled to the memory, and configured to execute the software instructions. The software instructions direct the processor to at least identify at least a primary data verification value generated by a primary control process that provides control in an industrial automation environment, and to identify at least a secondary data verification value generated by a secondary control process associated with the primary control process.

The software instructions also direct the processor to compare the primary data verification value with at least the secondary data verification value to determine if an error has occurred with respect to the primary control process.

In a further embodiment, a method for operating a control system in an industrial automation environment is provided. The method includes identifying at least a primary data verification value generated by a primary control process that provides control in an industrial automation environment, and identifying at least a secondary data verification value generated by a secondary control process associated with the primary control process.

The method also includes comparing the primary data verification value with at least the secondary data verification value to determine if an error has occurred with respect to the primary control process.

This overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
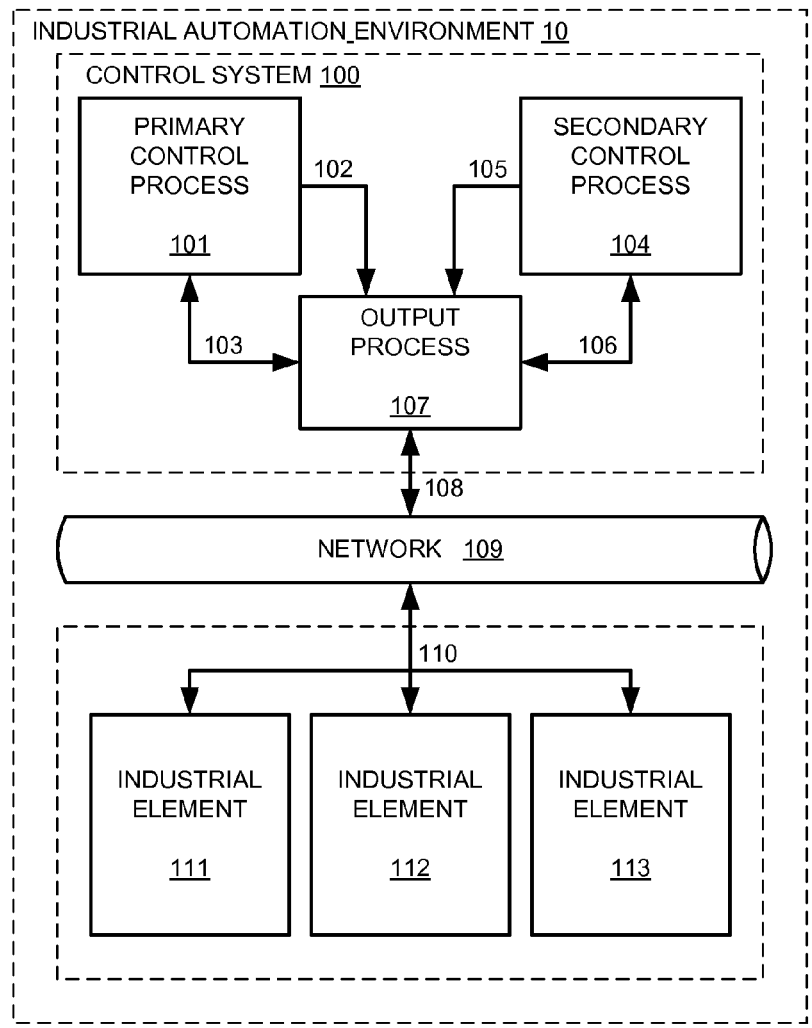
FIG. 1 illustrates a block diagram of an industrial automation environment.

FIG. 1 illustrates a block diagram of an industrial automation environment 10. An example embodiment of an industrial automation environment 10 includes control system 100, network 109, and industrial elements 111, 112, and 113 which are controlled by control system 100 through network 109. Network 109 may be any network capable of exchanging electronic signals and data between control system 100 and industrial elements 111, 112, and 113. For example, network 109 may include an Ethernet network, a hardware bus, a backplane, a Wi-Fi network, or the like.

Control system 100 includes primary control process 101, secondary control process 104, and output process 107. Control system 100 may be implemented within a programmable automation controller, a programmable logic controller, a microcontroller, or the like.

Primary control process 101 and secondary control process 104 are configured to run one or more control programs in parallel, operating in lockstep. During normal operation output process 107 is configured to direct primary control process 101 to control industrial elements 111, 112, and 113 through the use of control and data signals 103, received from primary control process 101, which are then transmitted to network 109 through connections 108 and 110.

Secondary control process 104 operates in lockstep with primary control process 101 and periodically generates a secondary data verification value 105, while primary control process 101 periodically generates a primary data verification value 102. Output process 107 compares these two data verification values to detect errors within primary control process 101.

Data verification values 102 and 105 are representations of the current state of control processes 101 and 104 respectively. These representations are much more compact (in terms of number of bits and bytes) than simply examining the inputs, outputs, and storage node (such as registers) contents of the control processes. Data verification values 102 and 105 may be generated by processing the inputs, outputs, and storage node contents of the control processes by methods such as compression, sampling, and the like, resulting in compact values that may be quickly compared to determine if the current state of control processes 101 and 104 match.

In some embodiments primary data verification value 102 and secondary data verification value 105 are cyclic redundancy check (CRC) values. If the CRCs do not match, there likely is a failure in primary control process 101, and output process 107 then may switch control of industrial elements 111, 112, and 113 to secondary control process 104 or may take other desired actions such as an emergency shutdown of industrial elements 111, 112, and 113.

In some embodiments, each control process generates two 64-bit CRCs. These two CRCs may be generated by different CRC algorithms, with each algorithm generating one 64-bit CRC value for comparison by output process 107.

In other embodiments, multiple secondary control processes may be used allowing the primary control process to be compared to two or more secondary control processes. For example, in an embodiment with two secondary control processes, the three data verification values may be compared, and if two match, the third value indicates the control process with the error condition and control may be transferred to one of the other control processes.

Note that multiple control processes may be run by primary control process 101 and secondary control process 104 concurrently. These control processes may operate at different speeds depending on the requirements of the industrial elements they are controlling. For example, if both primary control process 101 and secondary control process 104 are running three control processes each, output process 107, by comparing data verification values 102 and 105, may determine that one of the processes in primary control process 101 is in an error condition.

At that point in time, output process 107 may transfer control of that single process to secondary control process 104, while allowing primary control process 101 to continue control of the other two processes. In other embodiments, output process 107 may transfer control of all three processes to secondary control process 104, may shutdown the process in error, or may shutdown all three processes, depending upon the requirements of the industrial environment.

Since output process 107 is comparing data verification values (such as CRCs) between the two control processes instead of comparing images of the programs and their data, output process 107 is able to transfer control between control processes within a single cycle, thus allowing for smooth transfer of control as soon as an error is detected without an interruption of the control data and instructions being exchanged with industrial elements 111, 112, and 113.

Figure 2:
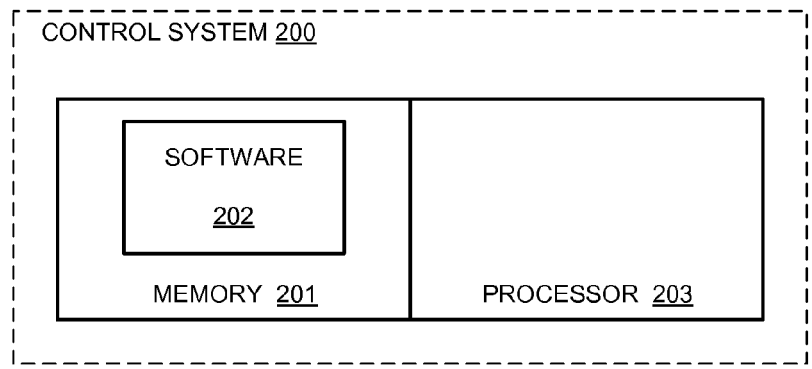
FIG. 2 illustrates a block diagram of a control system within an industrial automation environment.

FIG. 2 illustrates a block diagram of a control system 200 within an industrial automation environment. This block diagram illustrates the physical hardware used by control system 200 in providing failsafe control of industrial elements within an industrial automation environment.

Control system 200 includes memory 201 and processor 203. Memory 201 is configured to store software instructions 202 which direct processor 203 to provide failsafe control of industrial elements within an industrial automation environment. Processor 203 may be a programmable automation controller, a programmable logic controller, a microcontroller, or the like.

The software instructions direct the processor to at least identify at least a primary data verification value generated by a primary control process that provides control in an industrial automation environment, and to identify at least a secondary data verification value generated by a secondary control process associated with the primary control process.

The software instructions also direct the processor to compare the primary data verification value with at least the secondary data verification value to determine if an error has occurred with respect to the primary control process.

In other embodiments, the software instruction direct the processor to react in response to determining that the error has occurred, by modifying the control provided by the primary control process. This modification of the control provided by the primary control process may include prohibiting the control of the industrial automation environment by the primary control process.

The modification may also include transferring the control from the primary control process to the secondary control process, or by performing an emergency shutdown of the industrial automation environment.

In other example embodiments, in response to determining that the error has occurred, the processor may modify additional control provided by an additional control process that provides the additional control in the industrial automation environment, as in the example of three control processes discussed above with respect to FIG. 1.

In some embodiments, the data verification values comprise cyclic redundancy check values, and these CRC values may be two 64-bit CRC values in these embodiments.

Figure 3:
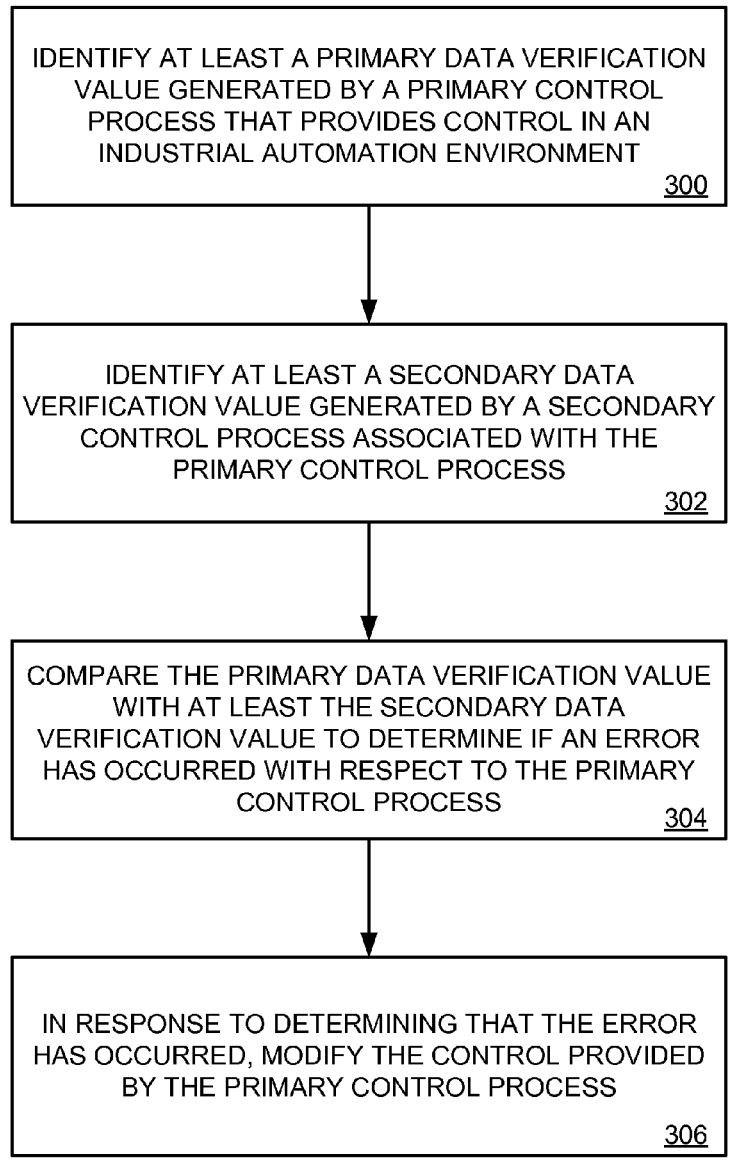
FIG. 3 illustrates a flow diagram of a method for operating a control system within an industrial automation environment.

FIG. 3 illustrates a flow diagram of a method for operating a control system 100 within an industrial automation environment 10. In this example embodiment of a method for operating a control system 100 within an industrial automation environment 10, the control system 100 identifies at least a primary data verification value 102 generated by a primary control process 101 that provides control in an industrial automation environment (industrial elements 111, 112, and 113), operation 300.

The control system 100 also identifies at least a secondary data verification value 105 generated by a secondary control process 104 associated with the primary control process 101, operation 302. The control system 100 compares the primary data verification value 102 with at least the secondary data verification value 105 to determine if an error has occurred with respect to the primary control process 101, operation 304.

In response to determining that the error has occurred, the control system 100 modifies the control provided by the primary control process 101, operation 306. This modification may include removing control from the primary control process 101, transferring control to the secondary control process 102, performing an emergency shutdown of the industrial automation environment, or the like.

Figure 4:
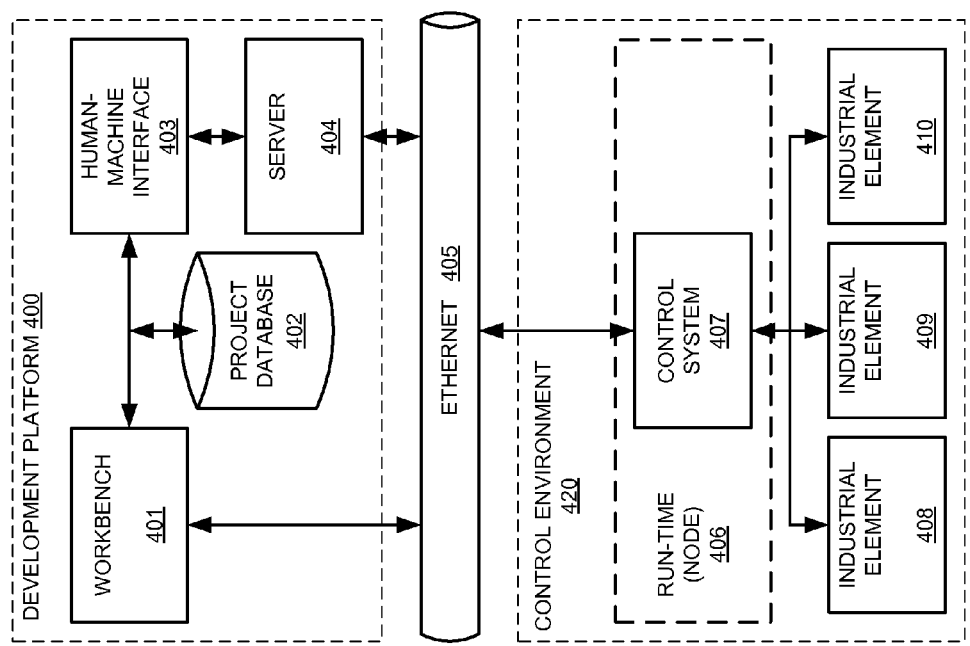
FIG. 4 illustrates a block diagram of an industrial automation control system environment.

FIG. 4 illustrates a block diagram of an industrial automation control system programming environment. This environment provides for the computer-aided development of control applications. The control applications are made up of resources (i.e., virtual machines at run time). The applications are made up of I/O points and variables, and control logic in any of the IEC 61131-3 languages and the IEC 61499 distribution method.

This embodiment of an industrial automation control system programming environment includes development platform 400 and control environment 420 which communicate through Ethernet 405. Development platform 400 includes workbench 401, project database 402, human-machine interface 403, and server 404. Control environment 420 includes run-time (node) 406 including control system 407, and industrial elements 408, 409, and 410 within an industrial automation environment.

In this example embodiment, development platform 400 and control environment 420 communicate through Ethernet 405, however other embodiments may communicate through other systems such as a hardware bus, a backplane, a Wi-Fi network, or any other system capable of interchanging electronic data between development platform 400 and control environment 420.

Industrial elements 408, 409, and 410 may include any type of element found in an industrial automation environment, including, but not limited to, machines, drives, pumps, sensors, human-machine interfaces, and the like.

Once resources are developed, they may be downloaded to control systems such as element 407 through Ethernet 405. Resources are made up of variables and Input/Output (I/O) points as well as programs developed using any of the five languages (SFC: Sequential Function Chart (or Grafcet), ST: Structured Text, IL: Instruction List, FBD: Function Block Diagram, and LD: Ladder Diagram) of the IEC 61131-3 standard or Flow Chart. One can also use the IEC 61499 language, i.e. distribution method, where individual IEC 61499 function blocks belonging to IEC 61499 programs are distributed across multiple resources.

Resources can share variables using internal bindings or external bindings. Internal bindings are between resources within the same project. External bindings are between resources belonging to different projects. When developing IEC 61499 programs, bindings are automatically created between function blocks declared in different resources. At run time, from the workbench, one can monitor the state of virtual machines running on their target nodes. One can also choose to run an application in simulation mode.

A screen builder enables creating screens, i.e., graphical user interfaces consisting of pages with a Java application, from which one can monitor or run control processes. These screens are linked with control projects created in the workbench. An application can consist of several screens linked together using hot link buttons. The PRDK enables the setting up of run-time modules for the available target platforms (Windows NT, VxWorks, QNX, Linux, and RTX) or the development of custom modules for other target platforms.

A control system, running in a control environment using a real-time operating system, is the link to the physical field equipment. This module executes the instructions contained in resources, downloaded from the workbench. The control system holds the virtual machine. Control system 407, a programmable logic controller (PLC), or any other similar controller, reads variables and I/O points, executes the process control application, and writes to variables and I/O points in a cyclic loop.

A PIO enables the addition of I/O devices to the kernel as well as the development of "C" functions, function blocks, and conversion functions. It also enables the development of IXL clients such as the OPC DA server, HiBeam data server, and workbench for the currently ported target platforms.

A Target Definition Builder utility enables the definition of custom items in the workbench, corresponding to items developed with the PRDK and PIO. One can receive notification of run-time system events from target nodes (run-time modules) using a logger and viewer.

Figure 5:
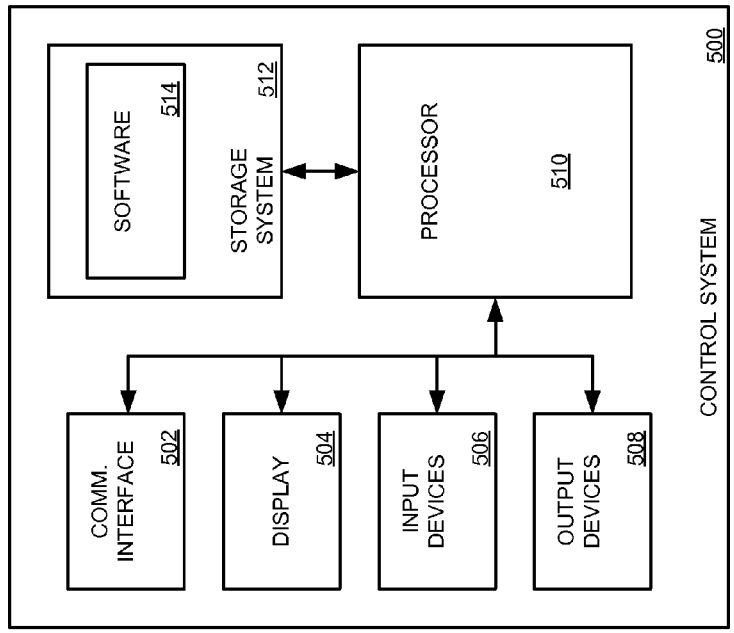
FIG. 5 illustrates a block diagram of a computer system configured to operate as a control system within an industrial automation control system environment.

FIG. 5 illustrates a block diagram of a computer system configured to operate as a control system 500 within an industrial automation control system environment. An industrial automation control system programming environment as illustrated in FIG. 4 is implemented on one or more control systems 500, as shown in FIG. 5. Control system 500 includes communication interface 502, display 504, input devices 506, output devices 508, processor 510, and storage system 512. Processor 510 is linked to communication interface 502, display 504, input devices 506, output devices 508, and storage system 512. Storage system 512 includes a non-transitory computer-readable storage media that stores operating software 514.

Communication interface 502 includes components that communicate over communication links, such as network cards, ports, RF transceivers, processing circuitry and software, or some other communication devices. Communication interface 502 may be configured to communicate over metallic, wireless, or optical links. Communication interface 502 may be configured to use TDM, IP, Ethernet, optical networking, wireless protocols, communication signaling, or some other communication format—including combinations thereof.

Communication interface 502 may also be configured to receive and transmit transitory computer-readable communication media which may then be stored in storage system 512 as non-transitory computer-readable storage media.

Display 504 may be any type of display capable of presenting information to a user. Displays may include touch screens in some embodiments. Input devices 506 include any device capable of capturing user inputs and transferring them to control system 500. Input devices 506 may include a keyboard, mouse, touch pad, or some other user input apparatus. Output devices 508 include any device capable of transferring outputs from control system 500 to a user. Output devices 508 may include printers, projectors, displays, or some other user output apparatus. Display 504, input devices 506, and output devices 508 may be external to computer aided design system 500 or omitted in some examples.

Processor 510 includes a microprocessor and other circuitry that retrieves and executes operating software 514 from storage system 512. Storage system 512 includes a disk drive, flash drive, data storage circuitry, or some other non-transitory memory apparatus. Operating software 514 includes computer programs, firmware, or some other form of machine-readable processing instructions. Operating software 514 may include an operating system, utilities, drivers, network interfaces, applications, or some other type of software. When executed by processing circuitry, operating software 514 directs processor 510 to operate control system 500 as an industrial automation control system environment as illustrated in FIG. 4.

In this example, control system 500 executes a number of methods stored as software 514 within storage system 512. The results of these graphical element modifications are displayed to a user via display 504, or output devices 508. Input devices 506 allows users to input a variety of data required by the computer aided design system.

Figure 6:
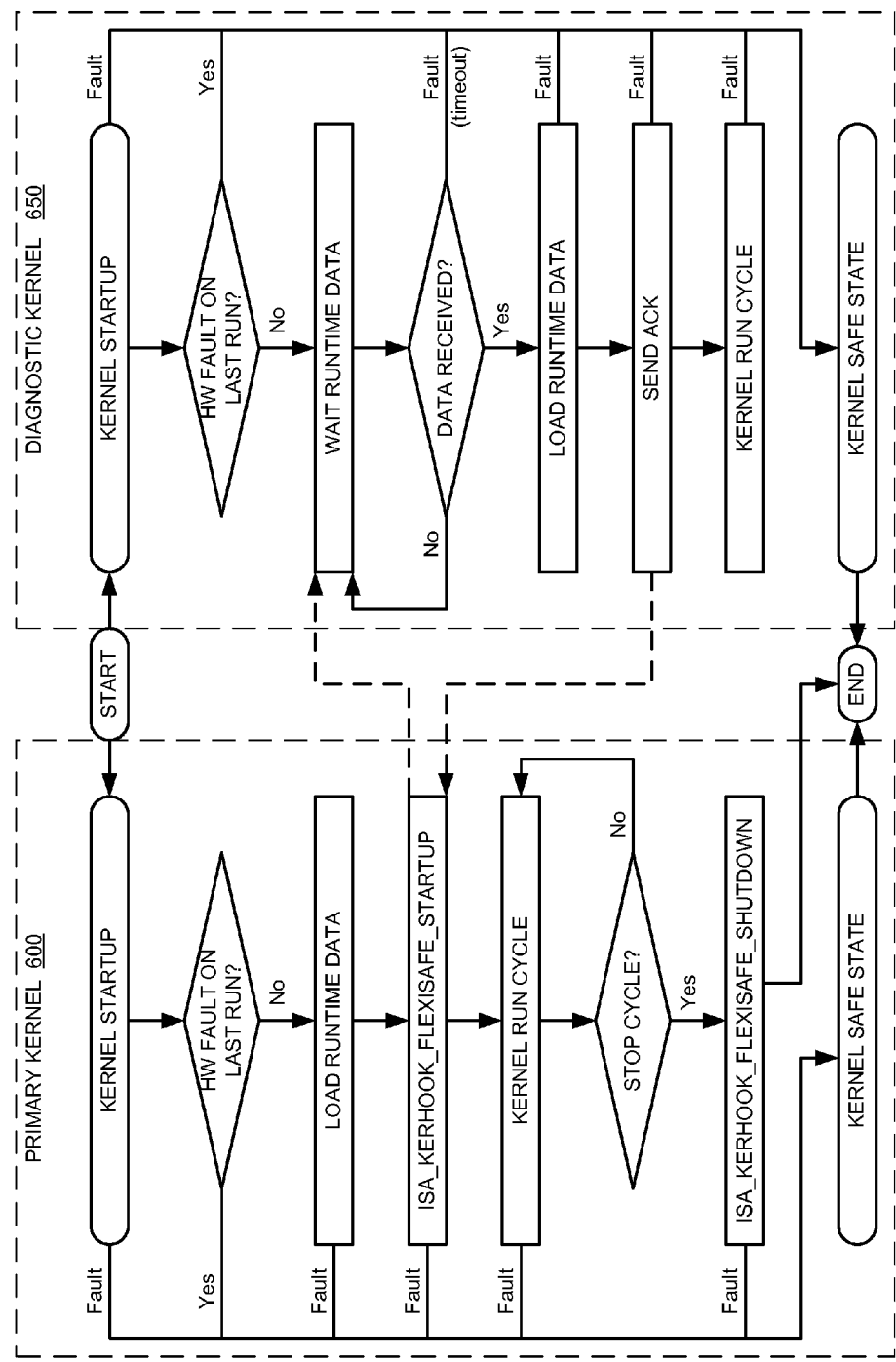
FIG. 6 illustrates a flow diagram of a kernel start-up sequence for both a primary and a secondary kernel within an industrial automation control system.

FIG. 6 illustrates a flow diagram of a kernel start-up sequence for both a primary 600 and a secondary 650 kernel within an industrial automation control system. It is required to be able to download an application on the primary kernel 600 which will, in turn, transfer this application to the secondary kernel 650 since they must execute the same application.

FIG. 6 shows the kernel start-up sequence of both the primary 600 and the secondary 650 kernels. Both kernels will execute the same resource but the resource will only be downloaded on the first kernel. It will thus be the responsibility of the first kernel to transmit the application to the secondary kernel, through the kernel communication path. This will be done in the start-up/download sequence described in this section. Note that if, upon start-up, the secondary kernel also has an application loaded with the same resource number, then the primary will not download it again if the CRC of the application running on the secondary kernel matches the CRC of the application running on the first kernel. This CRC checking mechanism will take into account the online modifications as well, if any.

Note that this start-up sequence must also be done after a download, since the application is changed during the download and thus needs to be sent to the secondary kernel.

Figure 7:
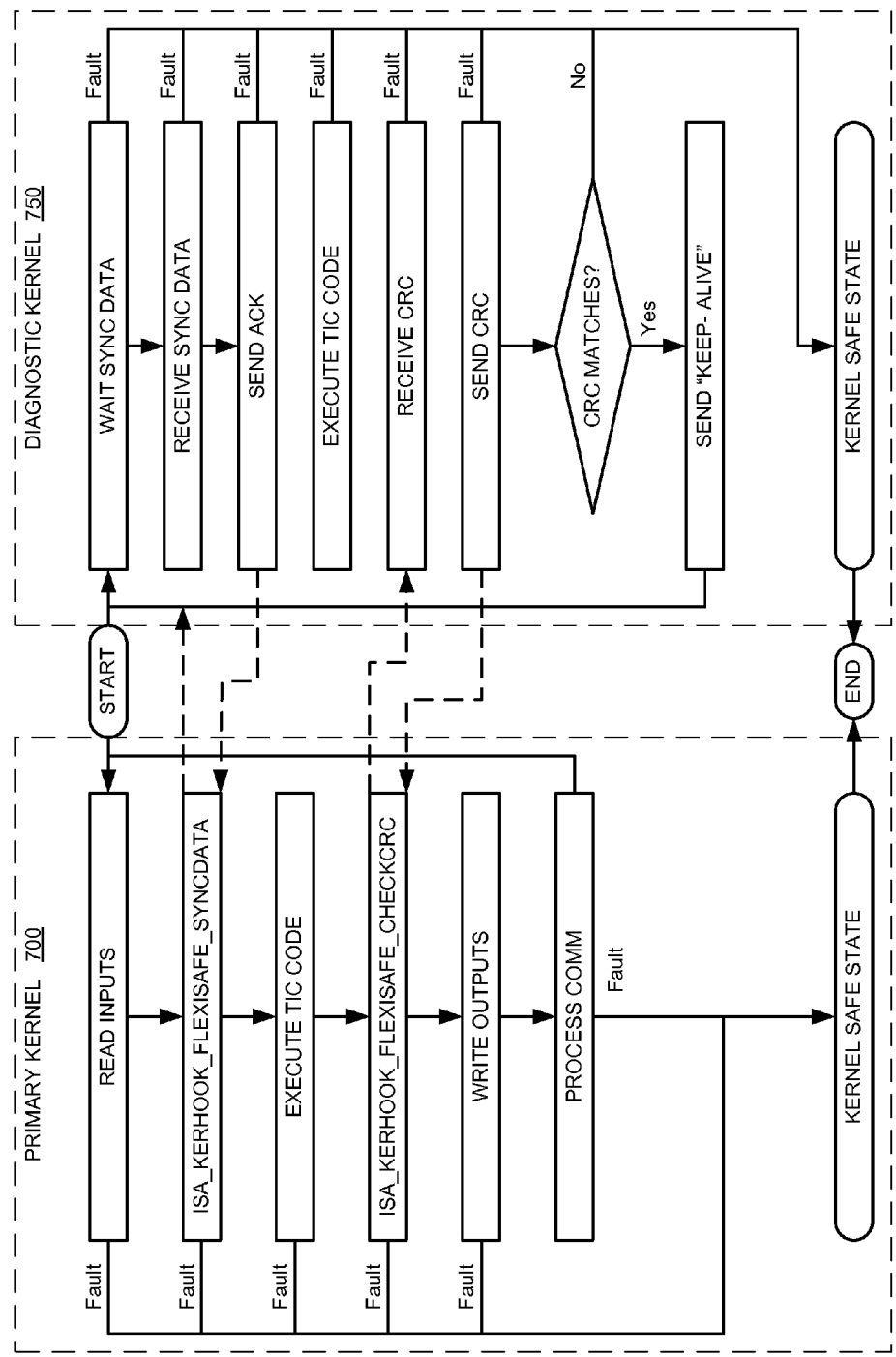
FIG. 7 illustrates a flow diagram of a kernel execution for both a primary and a secondary kernel within an industrial automation control system.

The primary 600 and secondary 650 kernels thus need to communicate at different stages of the start-up sequence and of the execution sequence (illustrated in FIG. 7). In order to simplify the communication mechanism and avoid any deadlocks in the communication between the primary and secondary kernels, communication will always be initiated by the primary kernel and will always be synchronous i.e. blocking. Note that the IXL interface supports communication timeouts. The kernel communication path timeout value is configurable through the extended resource OEM parameters, where the address of the secondary kernel is also specified.

Upon start-up, each kernel needs to know if it is the primary 600 or the secondary 650 kernel. Since both kernels will execute the same application (resource), they will both use the same data and nothing in this data can distinguish which kernel is primary and which is secondary. A start-up parameter is used on the mono-task kernel to specify if it is the primary or the secondary. A kernel is currently started with the following command line which specifies the resource number:
"Isa-s=X"
where X is the resource number expressed in decimal format.

Extra optional start-up parameters are added to specify if the kernel is primary or secondary. In the absence of these new parameters, the kernel will neither be primary or secondary and will behave like the standard mono-task kernel, without any Flexisafe features.

The primary kernel will be started with the new -PR parameter as follows:
"Isa-s=X -PR"
The secondary kernel will be started with the new -SE parameter as follows:
"Isa-s=X -SE"
Note that start-up parameters can also be specified through an INI file or through environment variables, depending on the type of porting used in the PRDK.

From FIG. 6, the primary kernel needs to perform these new tasks:
  detect the presence of the secondary kernel through the kernel communication path;
  synchronize the resource application data with the secondary kernel;
  wait for the secondary kernel to be ready (ACK); and
  go to a safe state in case of a problem.

From FIG. 6, the secondary kernel needs to perform these new tasks:
  wait for the resource application data from the primary kernel;
  signal readiness to the primary kernel (ACK);
  send "keepalive" message to the remote output driver; and
  go to a safe state in case of a problem.

All communications between the primary 600 and secondary 650 kernels will be initiated by the primary kernel 600. This will avoid any chance of a deadlock while simplifying the communication mechanism.

Secondary kernel 650 will thus be a server and primary kernel 600 will be its client and the existing IXL mechanism is re-used to communicate, as well as TCP sockets. Primary kernel 600 will thus use the IXL mechanism to send commands to secondary kernel 650 while the TCP sockets will be used during the kernel execution cycle, for performance reasons, as explained in reference to FIG. 7.

New IXL server commands will be created and primary kernel 600 will establish a blocking IXL connection with secondary kernel 650. Primary kernel 600 needs to determine which IXL driver to use, as well as the communication parameters. This will be done through the use of extended resource OEM parameters.

OEM parameters are defined in the target definition file (TDB) which is imported into the project database. The compiler then produces binary data which is downloaded and mapped by the kernel. Extra resource OEM parameters are added to identify the communication driver and parameters of the kernel communication path. This approach is suitable for a mono-task implementation but not for a multi-task implementation since all the resources of the multi-task implementation would have to share the same OEM parameters. In that case, it would be more appropriate to use network OEM parameters instead of resource OEM parameters. This approach will allow the primary kernel to have access to the kernel communication path parameters without making any changes to the compiler or to the GUI.

The mono-task kernel, on which the Flexisafe concept is based, does not have IXL client functions but does have an IXL server. The IXL server of the mono-task implementation does not support the HSD protocol however, since it is a local protocol and since there can only be one mono-task running at a time. Note that a Flexisafe environment will most likely be based on distinct CPU/memory for the primary and secondary kernels so it seems pointless to make an effort to support the HSD protocol in the mono-task implementation.

Note that even though there are more recent versions of the mono-task implementation on which the HSD protocol is supported on the server side, we would still have issues related to the naming of the shared memory since both the primary and secondary kernels would have the same resource number. These issues could be resolved in the future, however, by possibly using a different resource number for the secondary kernel.

However, it is still necessary to support IXL client communication on the mono-task kernel. The IXL server of the mono-task kernel is periodically activated to execute the connection polling function of each of the registered IXL drivers, excluding the HSD driver.

In the multi-task implementation, the IXL client interface requires the presence of an external process (ETCP, IsaRSI . . . ) to handle the communication and the IXL client program uses message queues to communicate with the external process. In the mono-task implementation there is no message queue implementation since there is only one process.

The quickest and easiest way to support IXL client communication on the mono-task kernel is to implement message queues in the mono-task system layer to be able to communicate with the (already existing) external process (ETCP. ISaRSI . . . ), taken from the multi-task implementation. Implementing message queues requires implementing shared memory in the system layer, at least in the Windows implementation. Thus, multi-task features are introduced into the mono-task implementation. This does not pose a problem as long as a multi-task operating system (such as Windows) is used for the Flexisafe kernel, if this kernel is to use the existing ETCP or ISaRSI drivers for the kernel communication path.

Note that if a designer wishes to create a new IXL driver, then this could be done without the use of message queues and not even on a multi-tasking OS. Of course, this would require the IXL driver to be embedded within the kernel code. The drivers used by the client portion of the IXL interface register their internal functions with the IXL API. These internal functions are used to establish remote connections, send/receive messages etc. In the case of the existing ETCP and ISaRSI drivers, these internal functions consist of a message queue mechanism (IPC) to convey commands between the IXL client process and the ETCP/ISaRSI process. Using the ETCP or ISaRSI driver for the client (mono-task kernel communication path) thus also requires the usage of a multi-task OS, since we have distinct processes. However, if it is necessary to create a new custom IXL driver to be used by the mono-task kernel on a mono-task OS, then nothing prevents the embedding of this new IXL driver within the mono-task kernel and thus avoiding using any IPC mechanism.

As mentioned above, the IXL client API needs to be integrated back into the mono-task implementation. First only keep the basic API functions to initialize the API, register drivers, define a connection and establish it. Then add/implement the required functions to support the loading, synchronization and diagnostics between the primary 600 and secondary kernels 650.

The sending of the runtime data by the primary 600 during start-up could be implemented in the form of the usual offline download. Thus, it is necessary to integrate the corresponding IXL client functions into the mono-task kernel. The remaining functions to synchronize the data and check the CRCs at each cycle will be implemented as new user-defined server commands, as described in the next section. However, since it is also required to support online changes, the use of the download mechanism would be inadequate since it only supports the "offline" download. Thus, a different and simpler approach is used based on the transfer of the binary files. The primary 600 will use the IXL interface to send the offline downloaded files as well as the online modifications to the secondary before starting it. We thus assume that the primary 600 will always save the downloaded code during the offline download and during the online change download.

FIG. 7 illustrates a flow diagram of a kernel execution for both a primary 700 and a secondary 750 kernel within an industrial automation control system. It is required that the secondary kernel 750 monitors the execution of the primary kernel 700, synchronize data and compare CRCs at each execution cycle.

From FIG. 7, primary kernel 700 needs to perform these new tasks:
send a synchronization message to the secondary kernel;
wait for acknowledgement from the secondary kernel;
calculate a data CRC;
send a data CRC to the secondary kernel;
receive a data CRC from the secondary kernel; and
compare both CRCs and go to a safe state if they do not match.

From FIG. 7, secondary kernel 750 needs to perform these new tasks:
wait for a synchronization message from the primary kernel;
acknowledge the synchronization message from the primary kernel;
calculate a data CRC;
receive a data CRC from the primary kernel;
send calculated data CRC to the primary kernel; and
compare both CRCs and go to a safe state if they do not match.

A new function will be added to the existing IO driver functions. The source code for the OEM implemented IO driver functions is generated by the TDBUILD application. This application produces empty "C" functions for each device in the project. Each device is associated to a driver, which can be seen as a group of devices. Each driver has its associated Init/Exit functions, which are called at resource Init/Exit. Each device (input or output) has its associated Open/Close functions, which are also called at resource Init/Exit. Each input device has its Read function, which is called at the beginning of the kernel cycle and each output device has its Write function, which is called at the end of the kernel cycle. The Read function updates the input variables while the Write function updates the output variables.

Secondary kernel 750 will not read or write the IOs but will instead send a "keep alive" message to the IO driver, at end of the cycle, instead of writing outputs. Each IO driver will thus now have its own Keepalive function, in addition to the existing Init/Exit functions.

The CRC calculation performed on the data at each cycle must not be time consuming and must also not involve variables which are based on the true system time, since the clocks on the primary and secondary controllers will never be identical.

The local system time is read by the "dsysTimeRead" function of the system layer.

The "dsysTimeRead" function is used by the kernel at the beginning and at the end of its cycle to calculate the cycle time and update some internal and system variables. These variables are used by the SFC engine to update the activity time of the active steps and by some standard function blocks to calculate the elapsed time. SFC program steps are represented by global structural variables at the beginning of the variable map but SFC function block steps are embedded within the instances and thus require more processing to be found.

The "dsysTimeRead" function is used to detect if a POU has been executing for longer than a specified time, when a "jump" TIC is detected.

The "dsysTimeRead" function is used by a random generator function (standard function: "Rand").

It seems that the simplest way to make sure both the primary and secondary kernels use the same time reference at the beginning of each cycle is to eliminate the call to the "dsysTimeRead" function by the secondary kernel and let it use the value transferred by the primary kernel. This would solve all the SFC and standard function block issues but not the case of the random generator standard function ("Rand"). It thus seems that the "Rand" standard function should be eliminated from the safety kernel, as well as the "CurrentIsaDate" standard function, for the same reason. Concerning the function used to determine if a POU has been executing for longer than a certain time, this function (tcyEnd) will continue to use the local system time to perform its checks since the time is only used internally and not a part of the resource data involved in the checksum calculation.

Regarding the calculation of the checksum, one could either do a checksum on the whole data space, at the end of the cycle, or update the checksum only with the values modified by the TIC or used as conditions by the TIC. Doing a checksum on the whole data space will take a lot of time if the application has a lot of data and will also require processing to avoid including pointers in the calculation. Note that there are pointers in all the SFC step/transition control variables. It thus seems more efficient to calculate the CRC on a TIC per TIC basis. This approach also has the advantage of validating the TIC execution sequence since CRC calculation is sequence dependent.

Previously, it was determined, how the CRC will be calculated on the data, as the TIC code modifies it i.e. on a TIC per TIC basis. However, before starting to execute the TIC, the data must be the same for both the primary and the secondary kernels.

As can be seen from FIG. 7, only primary kernel 700 reads inputs and writes outputs. This means that the IO input variables, which are also part of the data, and on which the CRC is calculated are never read by secondary kernel 750. They thus need to be transferred by primary kernel 700 at the beginning of each cycle. It does not seem necessary to synchronize the whole data space but only the IO input channel variables and the system time variable. This will save a considerable amount of time. Also note that, for performance reasons, TCP sockets will be used instead of IXL to transfer the synchronization data, as well as compare CRCs.

Note that one will also have to synchronize the values written on the primary kernel through the maintenance communication path. Primary kernel 700 will do this by performing an IXL write on the secondary through the IXL connection of the kernel communication path.

Note that one will also have to synchronize online changes since it is required to support online changes. This means that all online related IXL messages will be handled as usual by the primary (in maintenance mode only) and then relayed to the secondary on a synchronous basis.

Both the primary 700 and secondary 750 kernels can detect a fault and put the system in a FAILSAFE state.

FIGS. 8A-8D illustrate block diagrams of possible architectures using both a primary and a secondary kernel within an industrial automation control system.

Figure 8A:
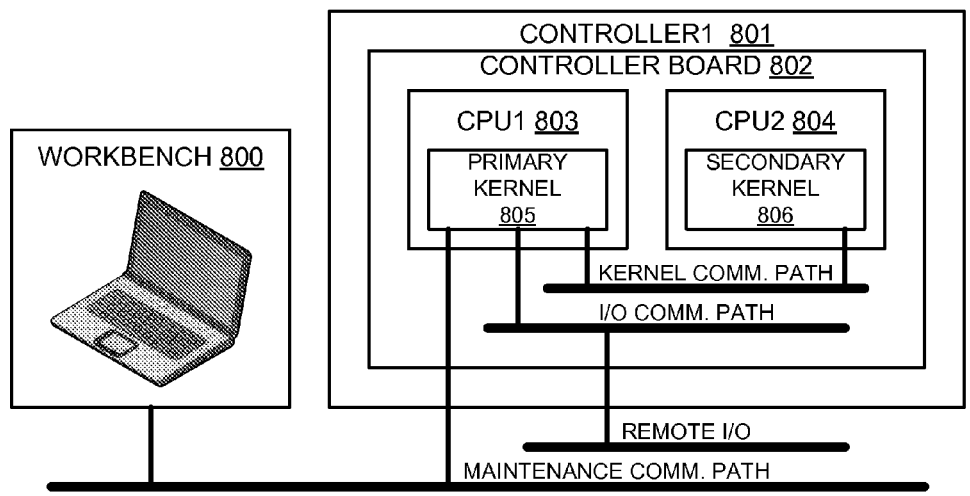
FIGS. 8A-8D illustrate block diagrams of possible architectures using both a primary and a secondary kernel within an industrial automation control system.
Figure 8B:
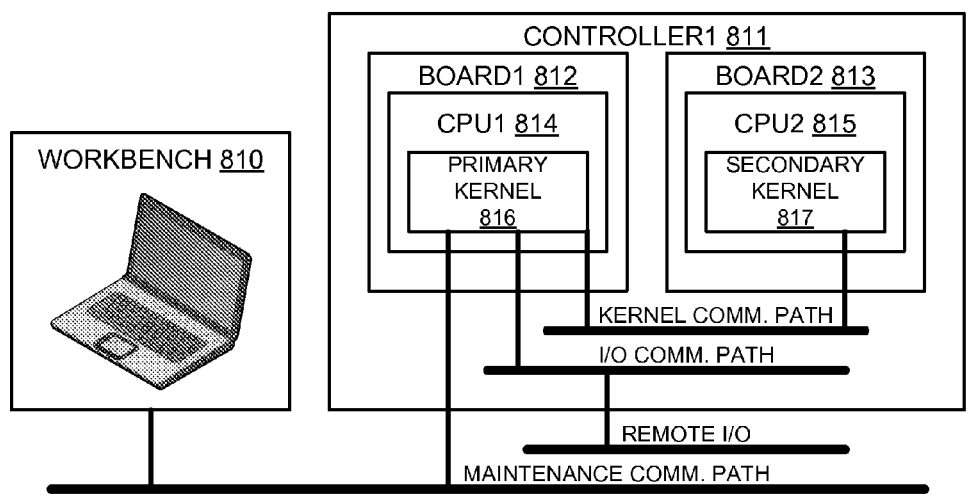
Figure 8C:
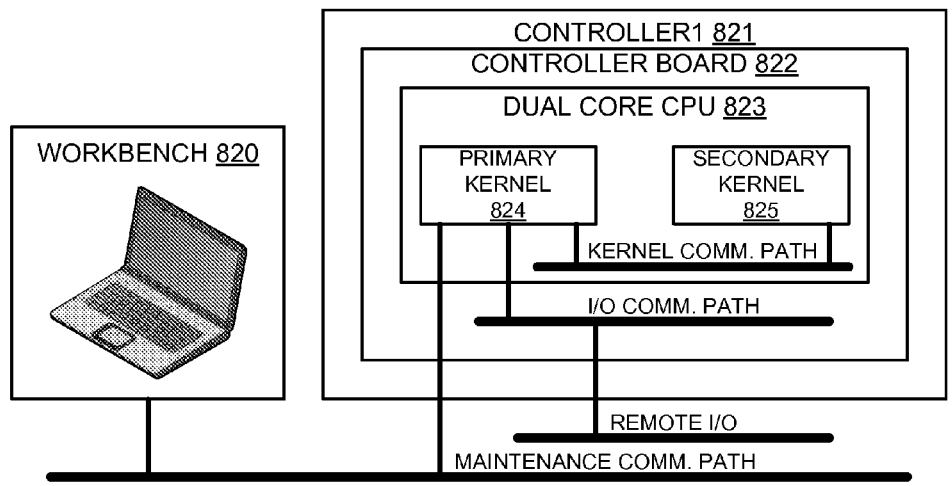

Standalone architecture is when both primary and secondary kernels are mounted on the same physical controller board (FIG. 8A) or on distinct physical boards within the same controller module (FIG. 8B). It is also possible to use a dual-core (FIG. 8C), in which case the Integrator must fulfil the requirements of Annex E of IEC61508-2. In this architecture, I/Os are still considered as remote since they can be local to the controller or at a remote location. The I/O communication path is how the Kernel I/O driver gets to reach the remote I/O. The Kernel communication path needs to be customized by the integrator as the means of communications between both CPUs is hardware specific. This is the recommended FlexiSafe architecture as it offers all diagnostics within the same controller board and allows the hardware system designer to use this in their own safety architecture.

Figure 8D:
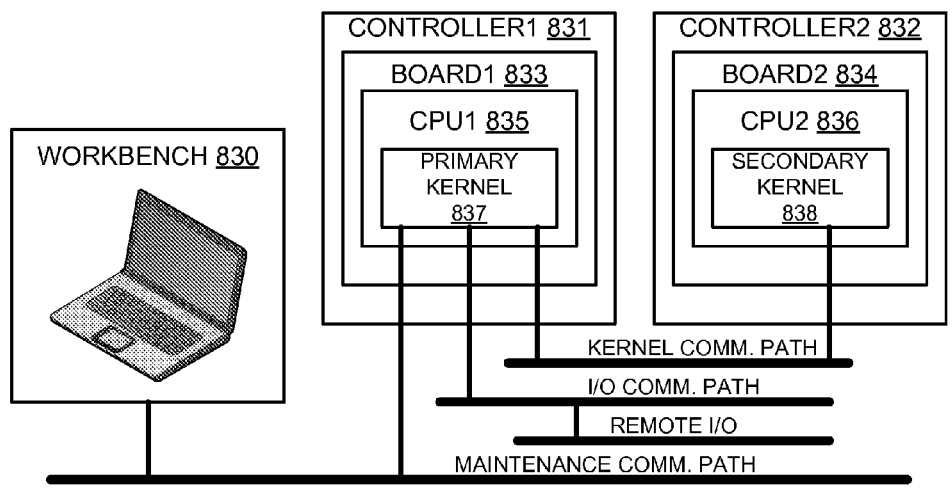

The distributed architecture is when the primary and secondary kernels are located on two distinct controller modules (FIG. 8D). The secondary kernel is intended to be used on hardware with the same specifications as the one running the primary kernel.

Figure 9A:
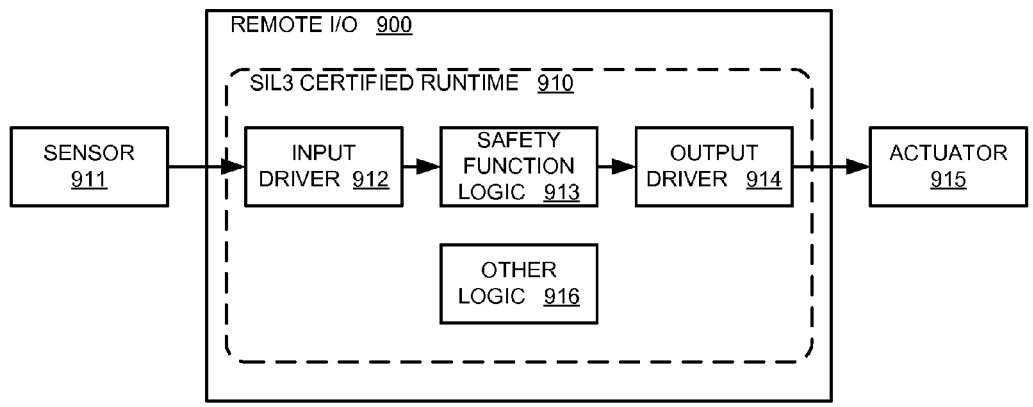
FIG. 9A illustrates a block diagram of a controller mixing safe and non-safe logic on the same kernel within an industrial automation control system.

FIG. 9A illustrates a block diagram of a controller mixing safe and non-safe logic on the same kernel within an industrial automation control system. FIG. 9A shows how safe and non-safe logic can be mixed for a safe kernel. It is the responsability of the end-user to prove that the non-safe logic does not affect the safe logic.

Figure 9B:
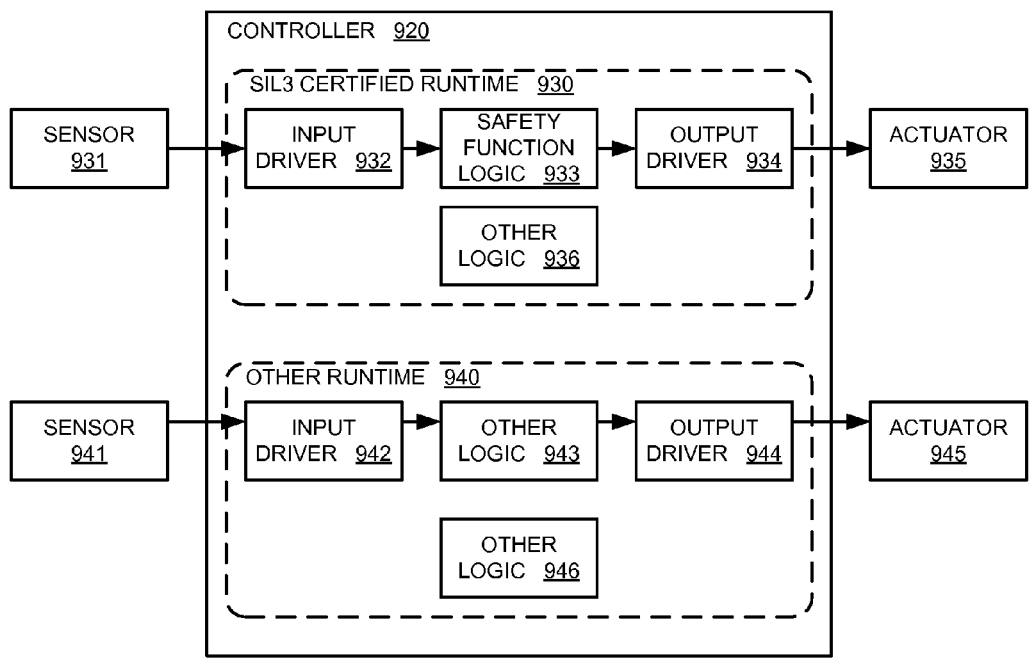
FIG. 9B illustrates a block diagram of a controller mixing safe and non-safe logic on separate kernels within an industrial automation control system.

FIG. 9B illustrates a block diagram of a controller mixing safe and non-safe logic on separate kernels within an industrial automation control system. It can also be possible to run a non-safety runtime on the same CPU/OS that is running a safe runtime. In such case, it is the responsability of the Integrator to prove (following the selected OS's safety manual), to ensure that the OS is capable of preventing non-safety tasks to affect the safety tasks. If the OS is not certified, other measures (diverse CPUs, Hypervisors, etc.) may also be used by the OEM to provide such separation.

Figure 10:
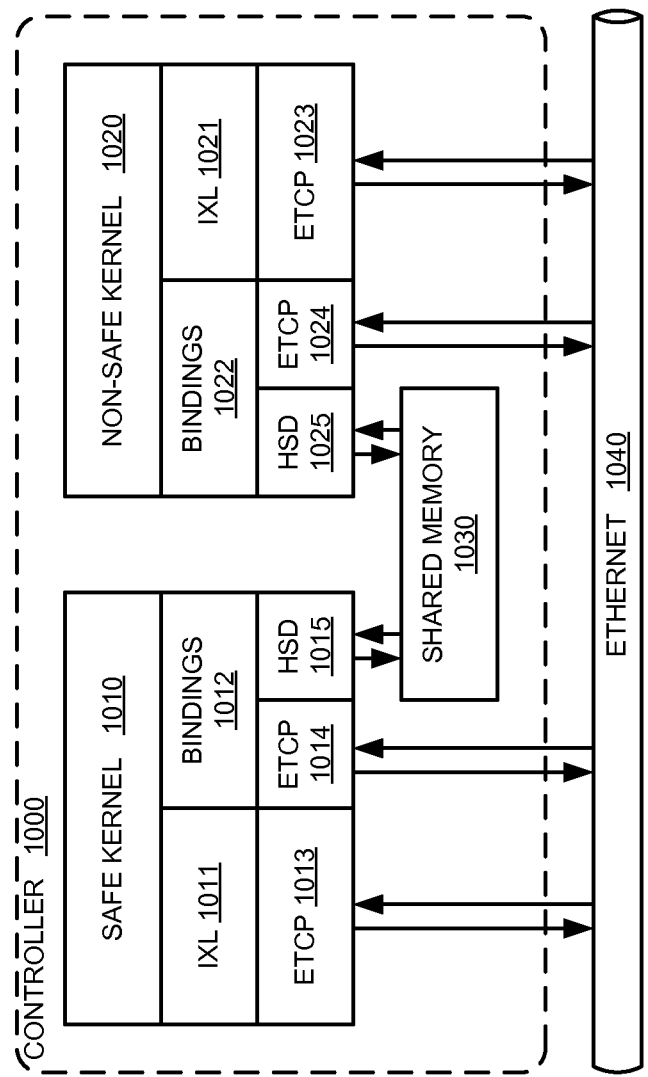
FIG. 10 illustrates a block diagram of a controller exchanging data between a safe kernel and a non-safe kernel within an industrial automation control system.

FIG. 10 illustrates a block diagram of a controller 1000 exchanging data between a safe kernel 1010 and a non-safe kernel 1020 within an industrial automation control system. Binding mechanisms 1012 and 1022 are used to exchange data between kernels 1010 and 1020, using IXL protocol blocks 1011 and 1021, and will only be enabled for SIL2 applications. On the same controller, HSD 1015 and 1024 (shared memory 1030) is used. Between controllers, ETCP 1013, 1014, 1023 and 1024 is used. Typically, there will be one Safety kernel and one or more non-safety kernel on the same controller. In either case, if the OEM wishes to exchange data between a safe and non-safe kernel, they must provide safety measures to ensure that the non-safe kernel will not impact the safe kernel. This can either be determined by the OS being used (for shared memory) or through the transport layer implemented for the communication path.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. One or more non-transitory computer-readable storage media having program instructions stored thereon for enhancing an automation environment that, when executed by a processor, direct the processor to at least:
   identify at least a primary data verification value generated by a primary control process that provides control in an industrial automation environment, wherein the primary control process is configured to run the plurality of control processes:
   identify at least a secondary data verification value generated by a secondary control process associated with the primary control process, wherein the secondary control process is configured to run the plurality of control processes:
   compare the primary data verification value with at least the secondary data verification value to determine if an error has occurred with respect to a first control of the plurality of control processes of the primary control process; and
   in response to determining that the error has occurred:
      modify the control provided by the primary control process to prohibit the control of the industrial automation environment by the first control of the primary control process and to allow the control of the industrial automation environment by a remainder of the plurality of control processes of the primary control process.

2. The one or more non-transitory computer-readable storage media of claim 1, wherein the program instructions further direct the processor to at least:
   transfer the control of the industrial automation environment by the first control from the primary control process to the secondary control process.

3. The one or more non-transitory computer-readable storage media of claim 1, wherein the program instructions further direct the processor to at least:
   perform an emergency shutdown of the industrial automation environment.

4. The one or more non-transitory computer-readable storage media of claim 1, wherein the program instructions further direct the processor to at least:
   in response to determining that the error has occurred, modify additional control provided by an additional control process that provides the additional control in the industrial automation environment.

5. The one or more non-transitory computer-readable storage media of claim 1, wherein the data verification values comprise cyclic redundancy check values.

6. The one or more non-transitory computer-readable storage media of claim 1, wherein the processor is of a type from the group comprising: a programmable automation controller, a programmable logic controller, and a microcontroller.

7. A control system for an industrial automation environment, the control system comprising:
   a memory configured to store software instructions;
   a processor coupled to the memory, and configured to execute the software instructions directing the processor to at least:
      identify at least a primary data verification value generated by a first process of a primary control process that provides control in an industrial automation environment;
      identify at least a secondary data verification value generated by a first process of a secondary control process associated with the first process of the primary control process;
      identify a third data verification value generated by a second process of the primary control process;
      identify a fourth data verification value generated by a second process of the secondary control process associated with the second process of the primary control process;
      compare the primary data verification value with at least the secondary data verification value to determine if an error has occurred with respect to the first process of the primary control process;
      compare the third data verification value with the fourth data verification value to determine if an error has occurred with respect to the second process of the primary control process; and
      in response to determining that the error has only occurred in the first process, transfer the control of the first process from the primary control process to the secondary control process while leaving control of the second process with the primary control process.

8. The control system of claim 7, wherein the processor is further configured to at least:
   prohibit the control of the industrial automation environment by the primary control process.

9. The control system of claim 8, wherein the processor is further configured to at least:
   perform an emergency shutdown of the industrial automation environment.

10. The control system of claim 7, wherein the processor is further configured to at least:
    modify additional control provided by an additional control process that provides the additional control in the industrial automation environment.

11. The control system of claim 7, wherein the data verification values comprise cyclic redundancy check values.

12. The control system of claim 7, wherein the processor is of a type from the group comprising: a programmable automation controller, a programmable logic controller, and a microcontroller.

13. A method for operating a control system in an industrial automation environment, the method comprising:
    identifying at least a primary data verification value generated by a primary control process configured to run a first primary control process and a second primary control process that provide control in an industrial automation environment;
    identifying at least a secondary data verification value generated by a secondary control process associated with the primary control process;
    comparing the primary data verification value with at least the secondary data verification value to determine if an error has occurred with respect to the first primary control process of the primary control process; and
    in response to determining that the error has occurred, modifying the control provided by the primary control process to prohibit the control of the industrial automation environment by the first primary control process and to allow the control of the industrial automation environment by the second primary control process of the primary control process.

14. The method of claim 13, further comprising:
modifying the control provided by the primary control process within a single cycle.

15. The method of claim 13, further comprising:
transferring the control of the industrial automation environment by the first primary control process from the primary control process to the secondary control process.

16. The method of claim 13, further comprising:
performing an emergency shutdown of the industrial automation environment.

17. The method of claim 13, further comprising:
in response to determining that the error has occurred, modifying additional control provided by an additional control process that provides the additional control in the industrial automation environment.

18. The method of claim 13, wherein the data verification values comprise cyclic redundancy check values.

* * * * *